United States Patent

[11] 3,619,486

[72] Inventor George J. Tzakis
Chicago, Ill.

[21] Appl. No. 853,156
[22] Filed Aug. 26, 1969
[45] Patented Nov. 9, 1971
[73] Assignee Zenith Radio Corporation
Chicago, Ill.

[54] MATRIX AMPLIFIER FOR DEVELOPING PUSH-PULL COLOR CONTROL SIGNALS
9 Claims, 3 Drawing Figs.

[52] U.S. Cl. .......... 178/5.4 MA, 330/15, 330/69
[51] Int. Cl. .......... H04n 9/52
[50] Field of Search .......... 178/5.4 MA, 5.4 SD, 5.4; 330/69, 15

[56] References Cited

UNITED STATES PATENTS

| | | | |
|---|---|---|---|
| 3,270,126 | 8/1966 | Crookshanks et al. | 178/5.4 |
| 3,275,944 | 9/1966 | Lavin | 330/69 |
| 3,304,512 | 2/1967 | McMillan | 336/69 |
| 3,304,513 | 2/1967 | Offner | 330/69 |
| 3,310,688 | 3/1967 | Ditkofsky | 330/69 |
| 3,429,987 | 2/1969 | Altmann | 178/5.4 |
| 3,506,776 | 4/1970 | Rennick | 178/5.4 |

*Primary Examiner*—Richard Murray
*Assistant Examiner*—P. M. Pecori
*Attorney*—Francis W. Crotty

ABSTRACT: A monolithic structure includes three transistorized differential amplifiers having a common bias network so that they all conduct the same amount of current. An additional pair of transistors connects with each of those amplifiers in cascode fashion and a color-difference signal is applied to one side of each differential amplifier while the luminance signal is applied to the opposite side with such polarity that push-pull primary color signals are developed at the outputs of the cascode circuits for application to a color picture tube. Retrace blanking pulses are applied along with the luminance signal to accomplish retrace blockout.

Inventor
George J. Tzakis
By Francis W. Crotty
Attorney

Inventor
George J. Tzakis
By Francis W. Crotty
Attorney

Inventor
George J. Tzakis
By Francis W. Crotty
Attorney

MATRIX AMPLIFIER FOR DEVELOPING PUSH-PULL COLOR CONTROL SIGNALS

BACKGROUND OF THE INVENTION

The invention is addressed to a matrix amplifier that is particularly suited for monolithic integration.

Matrix amplifiers are well known in the art and are used, for example, in processing the chrominance signal to develop the color control signals required for a three gun shadow-mask type of color-reproducing device. There are, in general, two matrix functions performed in a color receiver. It is common practice, for example, in demodulating the chrominance signal to develop two color-difference signals which may be matrixed with the luminance signal in order to develop the third color-difference signal required for application to the picture tube where an additional and internal matrixing is featured. In such a case, the matrixing of the luminance signal with each of the three color-difference signals takes place within the picture tube, developing the primary control signals internally of the picture tube. Alternatively, the additional matrixing of the color-difference and luminance signals may be accomplished externally of the picture tube to produce three primary control signals for application to the input circuits of the picture tube. It is this last-mentioned type of external matrix to which the present invention is particularly addressed.

Amplifiers for accomplishing external matrixing are, of course, well known and have been proposed in both discrete component and monolithic form. There is a distinct trend, however, to microcircuitry today and the invention makes possible an attractive microcircuit form of amplifier that not only accomplishes external matrixing but also facilitates the application of blanking pulses to the picture tube for retrace blockout. Particular advantages of the arrangement to be described are reductions in the voltage levels and power requirements as well as uniformity of output and improved DC stability. Accordingly, it is an object of the invention to provide a new and improved matrix amplifier for matrixing the luminance and color-difference signals in a color television receiver.

It is a particular object of the invention to provide such an amplifier that lends itself uniquely to microcircuitry, especially of monolithic form.

Another and particular object of the invention is to provide such a matrix amplifier which also facilitates accomplishing retrace blockout.

SUMMARY OF THE INVENTION

A matrix amplifier, constructed in accordance with the invention, develops push-pull color control signals from the luminance and three color-difference signals collectively representing a color image. The arrangement comprises three differential amplifiers individually including a high impedance component, such as the collector-emitter path of a transistor, plus a pair of transistor devices having collector, base and emitter electrodes and collectively arranged in a Y-type circuit configuration. The high impedance component is included in the collector-emitter paths of the pair of transistor devices in each such amplifier. A common bias means connects to the high impedance component of each of the amplifiers to establish the same current in that device of each such amplifier. Means are provided for applying the luminance signal to the base electrode of one of the pair of transistor devices of each of the amplifiers and, similarly, means are provided for applying the color-difference signals to the base electrode the other of the pair of transistor devices of these amplifiers, respectively. The polarities of these signals as applied to the transistor devices are related to develop at the collectors of the pair of transistor devices of the three differential amplifiers push-pull control signals representing the three color fields, respectively, of the image being translated. Additionally, there are means for deriving the push-pull control signals for application to a color image reproducer.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENTS

Figure 1:
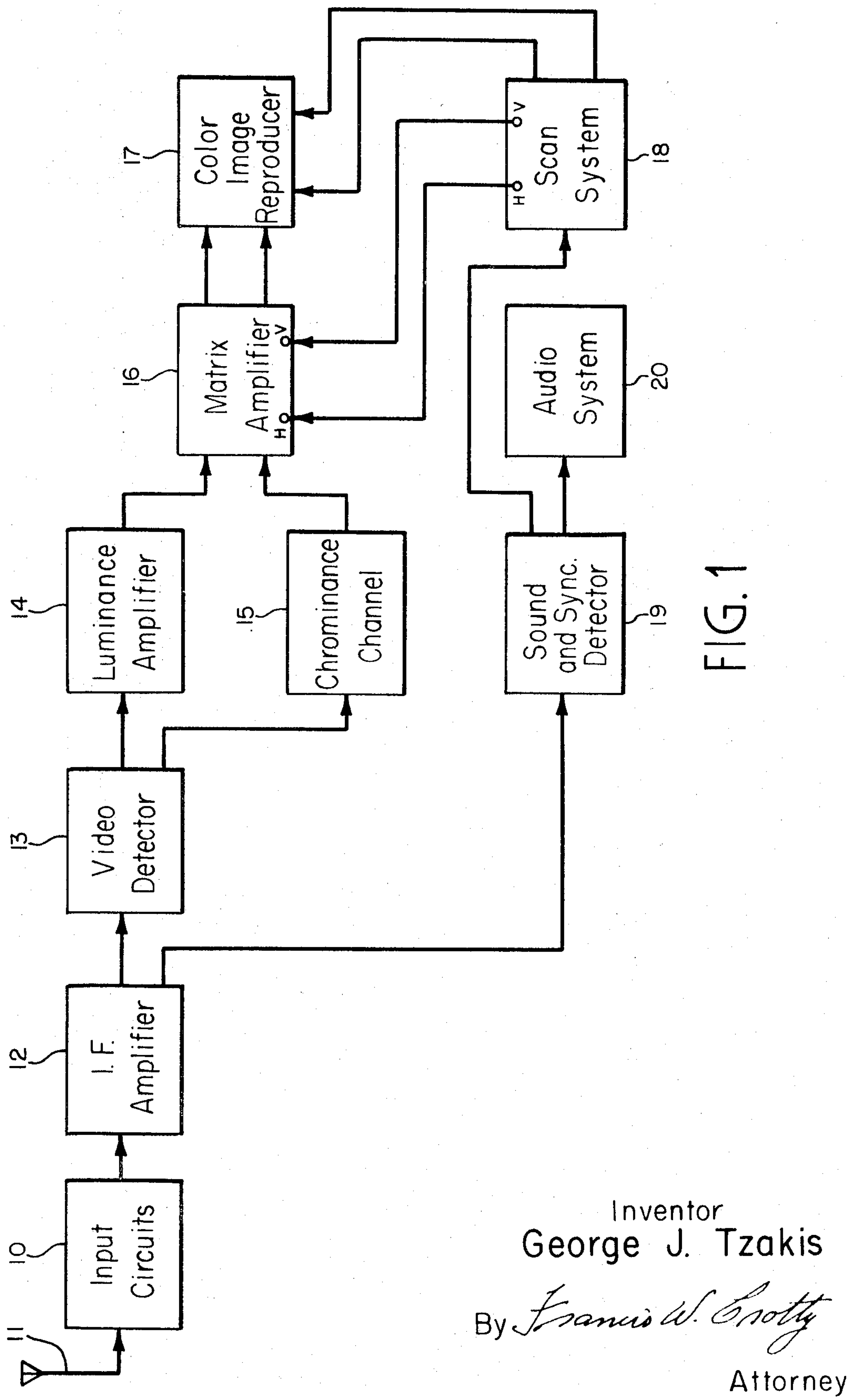
FIG. 1 is a block representation of a color television receiver which may employ a matrix amplifier in accordance with the invention.

Aside from the particulars of the amplifier employed for external matrixing, the receiver represented in FIG. 1 is conventional both as to structure and operation; therefore, its description will be brief. It comprises input circuitry 10 to which an antenna 11 is coupled and this circuitry will be understood to comprise radiofrequency selectors, a tunable heterodyning oscillator as well as the first detector or oscillator modulator which may be adjusted by customer controls to select a desired color program signal which is processed in unit 10 to an intermediate-frequency signal. After amplification in an intermediate-frequency amplifier 12, it is applied to a video detector 13 which may also include an emitter follower as an output stage. One output of detector 13 is delivered to a luminance amplifier 14 and another output is supplied to a chrominance channel 15. This channel has stages of chroma amplification and also a chroma demodulator, with or without a matrixing network but, in any event, arranged to develop three color-difference signals of negative polarity for application to an external matrixing amplifier 16. It is this amplifier to which the invention is particularly directed and its circuitry will be described in detail hereafter. Matrix amplifier 16 supplies color control signals to a color image reproducer 17 which usually is a three gun shadow-mask type of color picture tube. It will be observed that the figure indicates two connections from amplifier 16 to reproducer 17; this is intended to represent the application of push-pull control signals for each primary color with one applied to the cathode and the other applied to the first control grid of an assigned one of the three electron guns usually included in the shadow-mask color tube. These primary color control signals control each of three beams of the color tube so that as those beams scan the screen in a repeating series of parallel lines, they develop three color fields of the image resulting in image reproduction in simulated natural color. Scanning of the screen by these beams is under the control of the usual scan system 18 which includes line or horizontal as well as the field or vertical systems controlled by the synchronizing components of the received signal developed in a sound and sync detector 19 to which the receiver signal of intermediate-frequency form is delivered from amplifier 12. A second output of detector 19 is supplied to an audio system 20 so that the sound portion of the broadcast is reproduced concurrently with image reproduction. As stated above, aside from the particulars of amplifier 16, such a receiver is well understood and requires no further description. It is for this reason that the various accessories such as power supply, dynamic convergence and the like, which constitute no part of the present invention, have not been shown in the drawing or discussed. Particular attention is now directed to the circuitry of matrix amplifier 16 for developing push-pull control signals from the luminance and three color-difference signals collectively representing a color image.

Figure 2:
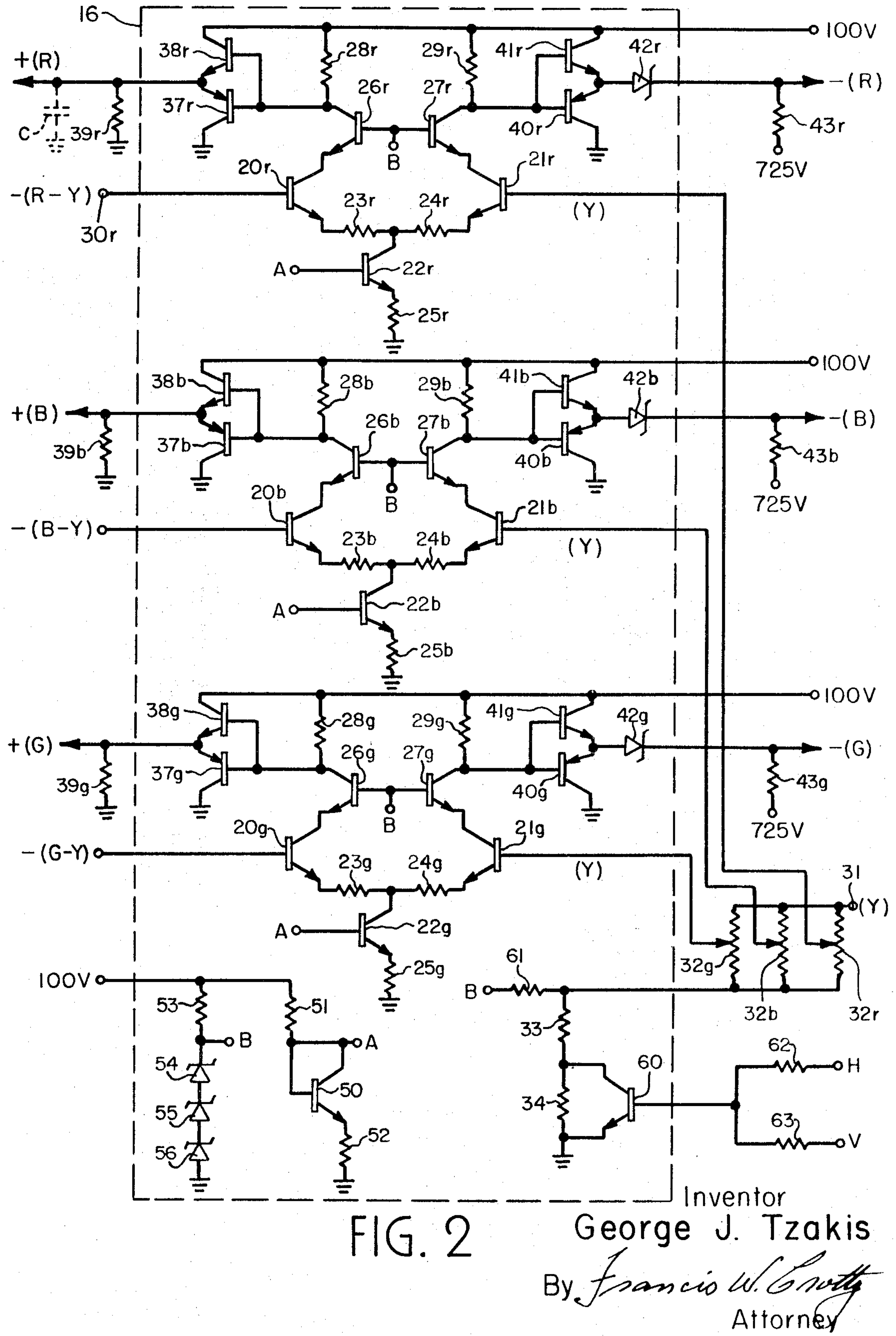
FIG. 2 is a schematic circuit diagram of a representative form of such a matrix amplifier.

The matrix amplifier shown in FIG. 2 is a microcircuit of the monolithic type having transistors, diodes and resistors which, for the most part, are built on a single substrate and enclosed by suitable encapsulation. The enclosed components are those contained within broken-line rectangle 16 and those components beyond the limits of that rectangle are outboarded, so to speak. That is to say, they are components that are physically exterior of the monolithic structure, being connected thereto in accordance with the circuit patterns represented in the figure.

The matrix amplifier has, as its major components three differential amplifiers, a tracking arrangement, a power supply, and a blanking circuit, which will be considered seriatim. The differential amplifiers are essentially identical, one being provided for each of the primary colors. Their various components are designated by the same reference numeral and are distinguishable from one another by a distinguishing letter *g*, *b* or *r*. For convenience only the red amplifier will be described. It includes three transistors 20*r*, 21*r*, 22*r* individually having collector, base and emitter electrodes and arranged in a Y-type circuit configuration with the collector-emitter path of one, constituting a constant current source or high impedance component, included in the collector-emitter paths of both of the remaining two. More specifically, the collector-emitter path of transistor 22*r* is common to the collector-emitter paths of transistors 20*r*, 21*r*. The emitters of transistors 20*r*, 21*r* are connected by resistors 23*r* and 24*r* while the junction of those resistors to the collector of transistor 22*r*. The emitter of this transistor connects to ground through an emitter resistor 25*r*.

Each differential amplifier has two additional transistors 26*r* and 27*r* having base, collector and emitter electrodes with their collector-emitter paths connected to the collector-emitter paths of transistors 20*r* and 21*r*, respectively, to define therewith cascode amplifiers. Transistors 26*r* and 27*r* have collector loads 28*r* and 29*r*, respectively, through which the collectors connect with a potential source coupled to the terminal designated 100V.

The signals to be matrixed are the color-difference signals which are developed in the color demodulator of chrominance channel 15 and the luminance signal obtained from luminance amplifier 14. Returning to a consideration of the illustrative red differential amplifier the red color-difference signal −(R−Y) is applied through an input terminal 30*r* to the base of transistor 20*r* and the luminance signal (Y) is applied to an input terminal 31 which connects with adjustable voltage dividers 32*r*, 32*b*, 32*g* arranged in parallel and returned to ground through series resistors 33 and 34. The adjustable tap of voltage divider 32*r* connects with the base of its assigned transistor 21*r*. Similar connections from the remaining voltage dividers complete a tracking arrangement through which the three differential amplifiers may be adjusted relative to one another. If desired, tracking may alternatively be accomplished by including potentiometers in the collector circuits of the three color amplifiers.

The relative polarities of the color-difference signal applied to the base of transistor 20*r* and the luminance signal applied to the base of transistor 21*r* are related to develop at the collector loads 28*r* and 29*r* primary color control signals of push-pull form. There are means for deriving those control signals for application to the color image reproducer 17 of FIG. 1. A positive polarity primary color control signal is derived from collector load 28*r* through a complementary symmetry type of emitter follower arrangement comprised of a PNP-transistor 37*r* and an NPN-type of transistor 38*r*. The base electrodes of these transistors connect together and to the junction of the collector electrode of transistor 26*r* and its load 28*r*. The emitters are connected together and the collector of transistor 38*r* connects to bias source 100V while the collector of transistor 37*r* connects to ground. The emitters of transistors 37*r*, 38 *r* are connected to ground through an emitter load 39*r* and the positive polarity red primary color control signal +(R) is supplied from emitter load 39*r* to grid one or the control grid of the gun of image reproducer 17 that is assigned to develop the red color field of the image being translated. A similar emitter follower arrangement of transistors 40*r* and 41*r* connects with the collector circuit of transistor 27*r* to derive the negative polarity red primary color control signal −(R). The takeoff of this last signal includes a Zener diode 42*r* which connects to a potential source 725V through a resistor 43*r* and provides means for establishing a substantially constant predetermined DC potential difference between the two output connections of the differential amplifier. This potential difference is the operating bias that is to be established between the first grid and cathode of the electron gun of the picture tube to which the particular differential amplifier connects. Necessary bias potentials for the transistors of the differential amplifier are obtained from a power supply presently to be described by connections between terminals of corresponding designation such as A—A and B—B.

A suitable power supply comprises a transistor 50 operated as a diode and connected through a resistor 51 to potential source 100V. The emitter of this transistor connects to ground through an emitter load 52. The base and collector are interconnected and through their connection to terminal A serve as a common bias means for establishing the same collector current in each of transistors 22*r*, 22*b* and 22*g* of the three differential amplifiers. Another branch of the power supply comprises a resistor 53 connected in series with three −6 volt Zener diodes 54, 55 and 56. Terminal B is the other bias terminal required for the differential amplifiers as indicated.

In order to achieve retrace blockout, the arrangement of FIG. 2 further comprises means for applying to at least one of the transistors of each of the differential amplifiers, other than the particular one which has its collector-emitter path in common to the remaining two, a periodically recurring retrace signal of such polarity as to introduce retrace blanking components into the push-pull control signals. As shown, the retrace signal is applied to the same transistor of each differential amplifier as the luminance signal; for the one illustrative stage, this is transistor 21*r*. The application of the retrace signals is through a transistor 60 having collector and emitter electrodes connected across resistor 34. A bias voltage is supplied to the collector of transistor 60 through a resistor 61 and resistor 33. Blanking pulses occurring at the line and field rates are available in scan system 18 and may be obtained, by way of illustration, from the terminals designated H and V and applied to similarly designated terminals of matrix amplifier 16. These terminals connect through resistors 62 and 63 to the base of transistor 60.

In describing the operation of the arrangement of FIG. 2, consideration will be given initially to the differential amplifier including transistors 20*r*, 21*r* and 22*r* which develops red primary color control signals in push-pull. The negative red color-difference signal −(R−Y) is applied to input terminal 30*r* concurrently with the application of luminance signal (Y) to the base of transistor 21*r*. Each applied signal is amplified and translated to the output circuits of both sides of the differential amplifier, considering transistor 20*r* to be on one side and transistor 21*r* to be on the other side of the red amplifier. A phase reversal is experienced by the color-difference signal in arriving at the collector of transistor 26*r* and, therefore, it appears in the collector circuit of that transistor as a signal (R−Y). At the same time, the luminance signal (Y) is translated without phase reversal from the base of transistor 21*r* to the collector of transistor 26*r* where it combines with the color-difference signal and develops the positive red primary color control signal +(R) for application to the control grid of the red electron gun of the color picture tube. Similar conditions exist in the other side of this same differential amplifier differing, however, in the manner of phase reversals. In this instance, the luminance signal (Y) is reversed in phase in its translation to the collector of transistor 27*r* where it appears as a negative signal −(Y). The color-difference signal −(R−Y) is translated from the base of transistor 20*r* to the collector of transistor 27*r* without a phase reversal where it combines with the luminance signal −(Y) and yields the negative red primary color control signal −(R) which is applied to the cathode of the red electron gun of the picture tube. There is a continual bleeder current or drain through Zener diode 42 which may establish a voltage level of approximately 80 volts, causing the push-pull red primary color control signals to have this amount of DC potential difference, serving as a grid-to-cathode bias for the red gun.

In the second differential amplifier comprising transistors **20*b*, 21*b* and 22*b*, the same type of signal translation and superpositioning takes place. Consequently, push-pull forms of the blue primary color control signal are applied from the two outputs of this amplifier to the control grid and cathode of the electron gun of the picture tube that is assigned to the blue field. In essentially identical fashion, the remaining differential amplifier which includes transistors 20*g*, 21*g* and 22*g*** develops the green primary color control signal in push-pull form for application to the control grid and cathode of the gun assigned to green in the color picture tube. Since this family of push-pull color control signals are developed concurrently and during the scanning of the image screen by the three beams of the tube, the image is synthesized in simulated natural color.

During retrace scanning intervals, however, all three electron beams of the color tube are cut off. During line retrace, for example, a horizontal pulse of positive polarity is applied to the base of transistor 60 where it is clipped on both sides and appears with opposite phase at the collector to be added to the luminance input at the base of transistor **21*r*. This pulse occurs with negative polarity in the output of transistor 26*r* and is, therefore, of the correct polarity for retrace blockout since this signal is applied to the control grid of the red electron gun of picture tube 17. Concurrently, the same retrace pulse appears with positive polarity in the collector or output of transistor 27*r*** and, therefore, is appropriate as a retrace blockout pulse for application to the cathode of the red electron gun to which the output of this particular transistor is delivered. In similar fashion, retrace blockout occurs on each of the other two guns of the shadow mask tube during horizontal retrace and in precisely the same way, on all three guns during vertical or field retrace.

The complementary symmetry type of emitter followers, formed by transistors **37*r*, 38*r* and 40*r*, 41*r*, avoid distortion due to diagonal clipping. This phenomenon will be understood when it is recognized, by way of illustration, that the control grid of the picture tube to which the output +(R) connects exhibits a capacitance C, shown in FIG. 2 in broken-construction line simply because it may be an inherent or distributed capacitance as distinguished from a discrete capacitor. In conjunction with resistor 39*r* it forms a time constant network in which clipping and distortion may be experienced unless a discharge path of sufficiently short time constant is provided for the capacitance. In normal operation, transistor 38*r* is conductive, providing the fast discharge path, but its companion transistor 37*r* is nonconductive. In the presence of a sharp negative-going signal excursion, transistor 38*r* becomes less conductive or, expressed differently, its impedance increases to the point where the discharge time constant of the network 39*r*, C is increased to such an extent that distortion or signal clipping results. This is avoided with the complementary symmetry arrangement because the companion transistor 37*r* tends to be rendered conductive in response to the negative-going signal excursion and the parameters of the circuit are adjusted so that conduction is established in transistor 37*r* when transistor 38*r* has decreased its conductivity to the point where clipping could ensue. The complementary symmetry type of emitter follower utilizing these two transistors avoids such clipping and the distortion that it would otherwise impose on the system. The similar emitter follower comprised of transistors 40*r*, 41*r*, operates in essentially the same way to avoid clipping that is otherwise attributable to Zener diode 42 and the capacitance associated with the cathode of the red gun of tube 17**.

A representative set of circuit values for one of the amplifier stages of FIG. 2 found to function properly is as follows:

| Resistors | |
|---|---|
| 23*r*, 24*r* | 430 ohms |
| 25*r* | 220 ohms |
| 28*r* | 15,000 ohms |
| 29*r* | 15,000 ohms |
| 39*r* | 100,000 ohms |
| 43*r* | 560,000 ohms |
| potentiometer 32*r* | 5,000 ohms |
| 33 | 15,000 ohms |
| 34 | 7,500 ohms |
| 51 | 17,300 ohms |
| 52 | 220 ohms |
| 53 | 68,000 ohms |
| 61 | 10,000 ohms |
| 62 | 100,000 ohms |
| 63 | 100,000 ohms |

Figure 3:
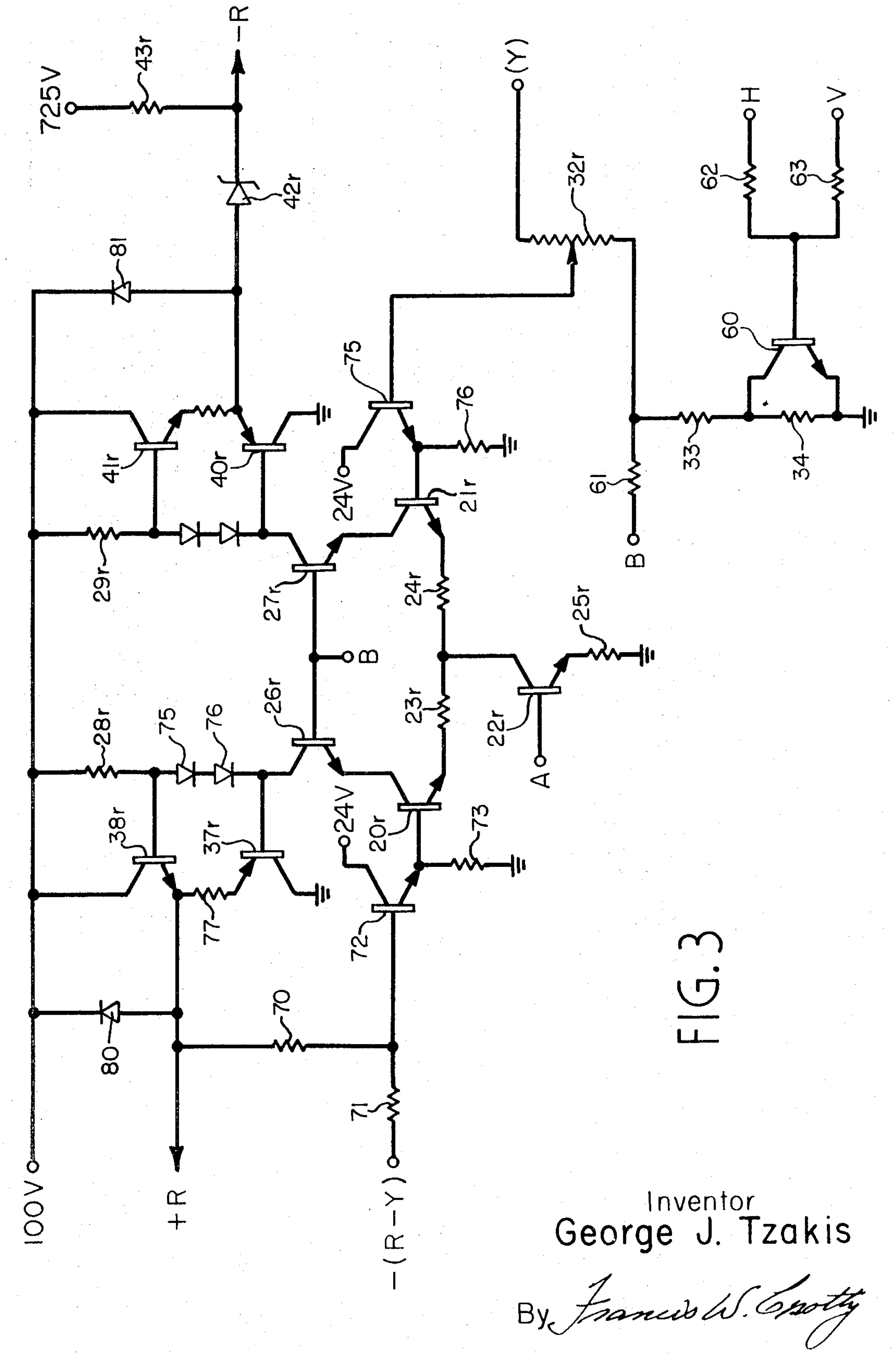
FIG. 3 shows a modification of one of the three stages of that amplifier.

FIG. 3 shows a modification of one of the differential amplifiers of the arrangement of FIG. 2. Its principal difference is a feedback loop for increased bandwidth, or for maintaining a desired bandwidth, with larger values of resistors **28*r* and 29*r* to the end that power dissipation is decreased. It will be observed that resistors 70 and 71 provide a negative feedback connection from the output terminal at which the signal +(R) is available to transistor 20*r* of the differential amplifier through an emitter follower 72 having a base connected to the junction of resistors 70, 71, a collector connected to a bias source 24V and an emitter grounded through a resistor 73. With this feedback, resistors 28*r* and 29*r*, for example, may be increased to 27,000 ohms. It will also be observed that the color-difference signal −(R−Y) in this embodiment is applied to the amplifier through emitter follower 72 and the luminance signal is similarly applied through an emitter follower 75, 76. While only one feedback path has been illustrated, the same type of arrangement may be provided for the other side of the differential amplifier, namely, the side including transistors 21*r*and 27*r***connected in cascode.

Another change in the embodiment of FIG. 3 is the inclusion of diodes 75 and 76 between the base electrodes of transistors **37*r*, 38*r* to eliminate a nonresponse or dead area between conduction points of these two transistors. The diodes bias transistors 37*r* and 38*r* to incipient conduction and the resistor 77 connected between the emitter electrodes serves to limit current in case the transistors do, in fact, become forward biased. As shown, a similar pair of diodes is associated with transistors 40*r* and 41*r***.

Still another change is the presence of arc suppressors 80 and 81 connected between the outputs on both sides of the differential amplifier and supply bus 100V. They clamp the collectors of transistors **38*r* and 41*r*** to a safe limit, protecting them against breakdown in the event of an arc transient which may occur in the electrode system of the red gun to which these outputs connect.

The described arrangements have the advantages inherently obtained with differential amplifiers of monolithic form, for example, rejection of common mode information or perturbations. It has the further important advantage over discrete versions of single-ended matrix amplifiers of reduced B+ voltage and power requirements, uniformity of outputs and improved DC stability to both power supply and warm up temperature variations. It will be apparent that the breakdown voltage requirements are reduced to about one-half through the use of an arrangement developing push-pull forms of color control signals. Such a system accommodates a given potential swing in the input circuit of the controlled picture tube with a voltage requirement which is half that of a matrix arrangement providing a single-ended output. The reduction in maximum potential will, of course, also provide a desired reduction in power consumption. The added transistors, **26*r* and 27*r* by way of example, which define cascode circuitry on both sides of the differential amplifier are also desirable. If they are omitted, transistors 20*r* and 21*r* must be arranged to have a high collector to emitter breakdown potential which is more difficult to achieve than for transistors 26*r* and 27*r* which operate with common base. Another advantage of the arrangement of FIG. 1 is the isolation which transistors 26*r* and 27*r* provide of the output with respect to the input. Since there is very little feedback, the impedance of the driving source is of less significance and, importantly, Miller effect is greatly reduced. Of course, the output emitter follower arrangement of transistors 37r and 38r** further isolates the input capacitances of the picture tube from the differential amplifier and its effect on bandwidth.

It will be understood that the bandwidth of each of the three stages of the differential amplifier is determined by the collector load impedance and the shunt capacity at the collector of the common base transistors 37r, 38r for example. With the monolithic structure, the bandwidths of the three stages have a tolerance of better than 5 percent because capability of matching resistors and capacitances. Moreover, retrace blockout is easily accommodated and the push-pull outputs may be at different DC potential levels for biasing purposes.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A matrix amplifier for developing push-pull color control signals from the luminance and three color-difference signals collectively representing a color image which comprises:

three differential amplifiers individually including a pair of transistor devices having collector, base and emitter electrodes, and a constant current source arranged in a Y-type circuit configuration with said current source included in the collector-emitter paths of both of said transistor devices;

common bias means for establishing the same current flow in said current source of each of said amplifiers;

means for applying said luminance signal to said base electrode of one of said pair of transistor devices of each of said amplifiers;

means for applying said color-difference signals to the other of said pair of transistor devices of said amplifiers, respectively, the polarities of said signals, as applied to said devices, being related to develop at said collectors of said pair of transistor devices of said amplifiers push-pull control signals representing the three color fields, respectively, of the image being translated;

and two additional transistors included in each of said differential amplifiers having base, collector and emitter electrodes with their collector-emitter paths connected in series with the collector-emitter paths of said pair of transistor devices, respectively, and with their base electrodes maintained at a fixed reference potential to define with said transistor devices cascode amplifiers for deriving said push-pull control signals for application to a color-image reproducer.

2. A matrix amplifier in accordance with claim 1 in which at least one of said cascode amplifiers includes a collector load across which one of said control signals is developed, and in which a pair of unidirectionally conductive control devices are connected in parallel across said collector load with such polarity that a given signal variation developed in said load affects the conductivity of said devices in opposite senses.

3. A matrix amplifier in accordance with claim 2 in which said conductive control devices comprise a pair of transistors connected to define complementary symmetry type of emitter followers coupled to said collector load.

4. A matrix amplifier in accordance with claim 3 which is a monolithic structure;

in which said means for deriving said push-pull control signals comprises a pair of output connections in each of said amplifiers;

and in which said monolithic structure further comprises means for establishing a substantially constant predetermined DC potential difference between said output connections of each of said amplifiers.

5. A matrix amplifier in accordance with claim 4 in which said means for establishing a DC potential difference comprises in each amplifier a Zener diode connected to one of the complementary symmetry types of emitter followers thereof.

6. A matrix amplifier in accordance with claim 4 which further comprises means for applying to at least one of said pair of transistor devices of each of said amplifiers a periodically recurring retrace signal of such polarity as to introduce retrace blanking components into said push-pull control signals to blank said image reproducer during retrace intervals.

7. A matrix amplifier in accordance with claim 6 in which said retrace signal is applied to the one of said pair of transistor devices that receives said luminance signal.

8. A matrix amplifier in accordance with claim 3 in which the base electrodes of the transistors constituting each complementary symmetry emitter follower are connected together by a biasing network including a pair of diodes for biasing said transistors to incipient conduction;

and in which the emitters of said transistors are interconnected by a current limiting impedance.

9. A matrix amplifier in accordance with claim 7 in which said means for applying said luminance signal to said differential amplifiers comprises three voltage dividers connected to said amplifiers, respectively, and relatively adjustable for tracking purposes, and in which said retrace signal is also applied through said voltage dividers.

* * * * *